US012559052B2

(12) United States Patent　　(10) Patent No.: US 12,559,052 B2
Akif et al.　　(45) Date of Patent: Feb. 24, 2026

(54) BEAM STRUCTURE FOR A BODY OF A MOTOR VEHICLE

(71) Applicant: Bayerische Motoren Werke Aktiengesellschaft, Munich (DE)

(72) Inventors: Oeztzan Akif, Munich (DE); Christian Hack, Schweitenkirchen (DE); Markus Stolp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 429 days.

(21) Appl. No.: 17/928,828

(22) PCT Filed: Aug. 13, 2021

(86) PCT No.: PCT/EP2021/072575
§ 371 (c)(1),
(2) Date: Nov. 30, 2022

(87) PCT Pub. No.: WO2022/043093
PCT Pub. Date: Mar. 3, 2022

(65) Prior Publication Data
US 2023/0211745 A1　　Jul. 6, 2023

(30) Foreign Application Priority Data

Aug. 28, 2020　(DE) ..................... 10 2020 122 514.8

(51) Int. Cl.
*B60R 19/34*　　(2006.01)
*B60R 19/18*　　(2006.01)
(52) U.S. Cl.
CPC ...... *B60R 19/34* (2013.01); *B60R 2019/1806* (2013.01)
(58) Field of Classification Search
CPC ....... B60R 19/34; B60R 19/26; B60R 19/023; B60R 19/04; B60R 19/12;
(Continued)

(56) References Cited

U.S. PATENT DOCUMENTS 7,510,232 B2 * 3/2009 Fortin ..................... B60R 19/12
293/143
10,618,482 B2 * 4/2020 Haggstrom ........... B60R 19/023
(Continued)

FOREIGN PATENT DOCUMENTS

CN　207190984 U　*　4/2018
CN　108025693 A　　5/2018
(Continued)

OTHER PUBLICATIONS

Holzkamm et al. (DE 102016102534 A1), machine translation (Year: 2017).*

(Continued)

*Primary Examiner* — Amy R Weisberg
*Assistant Examiner* — Enwei Zhuo
(74) *Attorney, Agent, or Firm* — Crowell & Moring LLP

(57)　　ABSTRACT
A beam structure for a body of a motor vehicle includes at least two shock-absorbing beam elements, which extend substantially in a longitudinal direction and each have a first outer wall, a second outer wall running substantially parallel to the first outer wall, and an inner wall running substantially parallel to the first outer wall and to the second outer wall. At least one cross-beam extends substantially in a transverse direction running perpendicularly to the longitudinal direction, and is disposed at a first end of the shock-absorbing beam elements and is connected both to the first outer wall and to the second outer wall and/or the inner wall. At least two structure elements are respectively disposed at the first end of one of the shock-absorbing beam elements and are connected to the second outer wall and/or the inner wall of the shock-absorbing beam element in question and/or to the cross-beam.

10 Claims, 6 Drawing Sheets

(58) Field of Classification Search
CPC ...... B60R 2019/1806; B60R 2019/242; B62D 21/152; B62D 21/155
USPC ........................ 293/132, 133, 143, 146, 154; 296/187.09, 187.1, 203.02, 193.09
See application file for complete search history.

(56) References Cited

U.S. PATENT DOCUMENTS

| | | | | |
|---|---|---|---|---|
| 2002/0079711 A1 * | 6/2002 | Kajiwara | ................ | B60R 19/34 293/133 |
| 2007/0024027 A1 * | 2/2007 | Pratt | ...................... | B60D 1/565 280/495 |
| 2008/0001383 A1 * | 1/2008 | Hodoya | ................... | B60D 1/56 280/477 |
| 2013/0001964 A1 | 1/2013 | Freundl et al. | | |
| 2017/0113638 A1 | 4/2017 | Ahuja et al. | | |
| 2018/0281710 A1 * | 10/2018 | Lindblom | ............... | B60R 19/44 |
| 2022/0161747 A1 * | 5/2022 | Inoue | ...................... | B60R 19/34 |

FOREIGN PATENT DOCUMENTS

| | | | | | |
|---|---|---|---|---|---|
| CN | 210941674 U | | 7/2020 | | |
| DE | 112012002726 T5 | * | 4/2014 | ............. | B60R 19/18 |
| DE | 10 2013 208 144 A1 | | 11/2014 | | |
| DE | 10 2014 109 961 A1 | | 1/2015 | | |
| DE | 10 2015 121 152 A1 | | 4/2017 | | |
| DE | 102016000948 A1 | * | 8/2017 | ............. | B60R 19/34 |
| DE | 102016102534 A1 | * | 8/2017 | | |
| DE | 10 2018 215 588 A1 | | 4/2019 | | |
| DE | 102020214189 A1 | * | 5/2022 | ............. | B60R 19/34 |
| DE | 102024002660 A1 | * | 10/2024 | | |
| DE | 102023131028 B3 | * | 1/2025 | ............. | B60R 19/34 |
| EP | 3100916 A1 | * | 12/2016 | ............. | B60R 19/26 |
| FR | 3153784 A1 | * | 4/2025 | ............. | B60R 19/18 |
| JP | 2017-7511 A | | 1/2017 | | |
| JP | 2017007511 A | * | 1/2017 | | |
| WO | WO-2024089494 A1 | * | 5/2024 | .......... | B62D 21/152 |

OTHER PUBLICATIONS

Freundl et al. (DE 112012002726 T5), machine translation (Year: 2014).*

Graf et al. (DE 102016000948 A1), machine translation (Year: 2017).*

International Search Report (PCT/ISA/210) issued in PCT Application No. PCT/EP2021/072575 dated Dec. 8, 2021 with English translation (six (6) pages).

German-language Written Opinion (PCT/ISA/237) issued in PCT Application No. PCT/EP2021/072575 dated Dec. 8, 2021 (seven (7) pages).

German-language Search Report issued in German Application No. 10 2020 122 514.8 dated Jun. 11, 2021 with partial English translation (12 pages).

English translation of Chinese-language Office Action issued in Chinese Application No. 202180040461.X dated Feb. 14, 2025 (7 pages).

* cited by examiner

Fig. 2a                    Fig. 2b

BEAM STRUCTURE FOR A BODY OF A MOTOR VEHICLE

BACKGROUND AND SUMMARY

The invention relates to a beam structure for a body of a motor vehicle, and a motor vehicle comprising such a beam structure.

Beam structures of the type cited initially are known from the prior art. Such a beam structure usually comprises two shock-absorbing beam elements which are connected together by means of a crossmember. The shock-absorbing beam elements may each be able to be connected to engine longitudinal member of the motor vehicle and are known as crash boxes.

In the beam structures known from the prior art, in the event of a traffic accident or in a crash test with high or low impact speed, the load path lengths in the beam structure and/or the engine longitudinal member and/or a front axle geometry of the motor vehicle may be influenced by lever effects, leading to an asymmetric load effect, in particular with a torque about a Y axis of the motor vehicle. This torque may lead to higher loads in the engine longitudinal member, increase a risk of plasticization in a low-speed crash, promote incorrect behavior of the engine crossmember, and/or disadvantageously influence the crumpling or buckling behavior of the beam structure in a high-speed or low-speed crash.

Furthermore, beam structures are known from the prior art with deformation elements which may be attached by various connecting methods and, depending on necessity of positioning of air inlets, may vary up or down along a Z axis of the motor vehicle. The deformation elements may have crumple beads which can ensure corresponding control of the load application onto a top or bottom web of the deformation element.

It is an object of the invention to propose a beam structure by means of which, in simple fashion, lever effects leading to an asymmetric load effect can be reduced so that an even crumpling behavior of the beam structure can be achieved, or stresses at the bearing points of the beam structure can be reduced.

This object is achieved by a beam structure and a motor vehicle having the beam structure according to the independent claims.

The beam structure according to the invention comprises at least two shock-absorbing beam elements which extend substantially in a longitudinal direction and each have a first outer wall, a second outer wall running substantially parallel to the first outer wall, and an inner wall running substantially parallel to the first outer wall and to the second outer wall; at least one crossmember which extends substantially in a transverse direction running perpendicularly to the longitudinal direction and is arranged at a first end of the shock-absorbing beam element and is connected both to the first outer wall and to the second outer wall and/or the inner wall; and at least two structural elements which are each arranged at the first end of one of the shock-absorbing beam elements and are connected to the second outer wall and/or the inner wall of the respective shock-absorbing beam element and/or to the crossmember.

The beam structure according to the invention may reduce an asymmetric load effect in the engine longitudinal member and/or in the body of the motor vehicle.

In a preferred embodiment, the crossmember and the structural element together, in a height direction running transversely to the longitudinal direction and transversely to the transverse direction, have an installation height which corresponds approximately to an installation height of the shock-absorbing beam element in the height direction, and/or is greater than the installation height of the shock-absorbing beam element in the height direction.

With this design, the asymmetric load effect can be further reduced.

Preferably, the crossmember comprises a contact face protruding in the longitudinal direction which, in a height direction running transversely to the longitudinal direction and transversely to the transverse direction, has an installation height which is smaller than an installation height of the shock-absorbing beam element in the height direction.

In a preferred embodiment, the at least two structural elements are each connected by means of a screw connection to the crossmember and/or to the respective shock-absorbing beam element.

With this design, the asymmetric load effect can be further reduced.

Preferably, the at least two structural elements each comprise a third outer wall which runs substantially coplanar with the second outer wall of the respective shock-absorbing beam element and/or bears on the second outer wall of the respective shock-absorbing beam element.

In a preferred embodiment, the crossmember, in particular the contact face of the crossmember, together with the structural element, forms a force input surface which extends substantially orthogonally to the longitudinal direction and/or to the first outer wall and/or to the second outer wall and/or to the third outer wall.

Preferably, the structural element comprises at least one fixing portion for fixing of additional components, which extends preferably substantially in a plane running orthogonally to the transverse direction.

In a preferred embodiment, the shock-absorbing beam element furthermore comprises a cutout formed in the second outer wall, through which the fixing portion extends.

The invention furthermore concerns a motor vehicle comprising a body with a beam structure according to the invention.

Details and further advantages of the beam structure according to the invention and the motor vehicle according to the invention are explained below with reference to three exemplary embodiments.

DETAILED DESCRIPTION OF THE DRAWINGS

Figure 1:
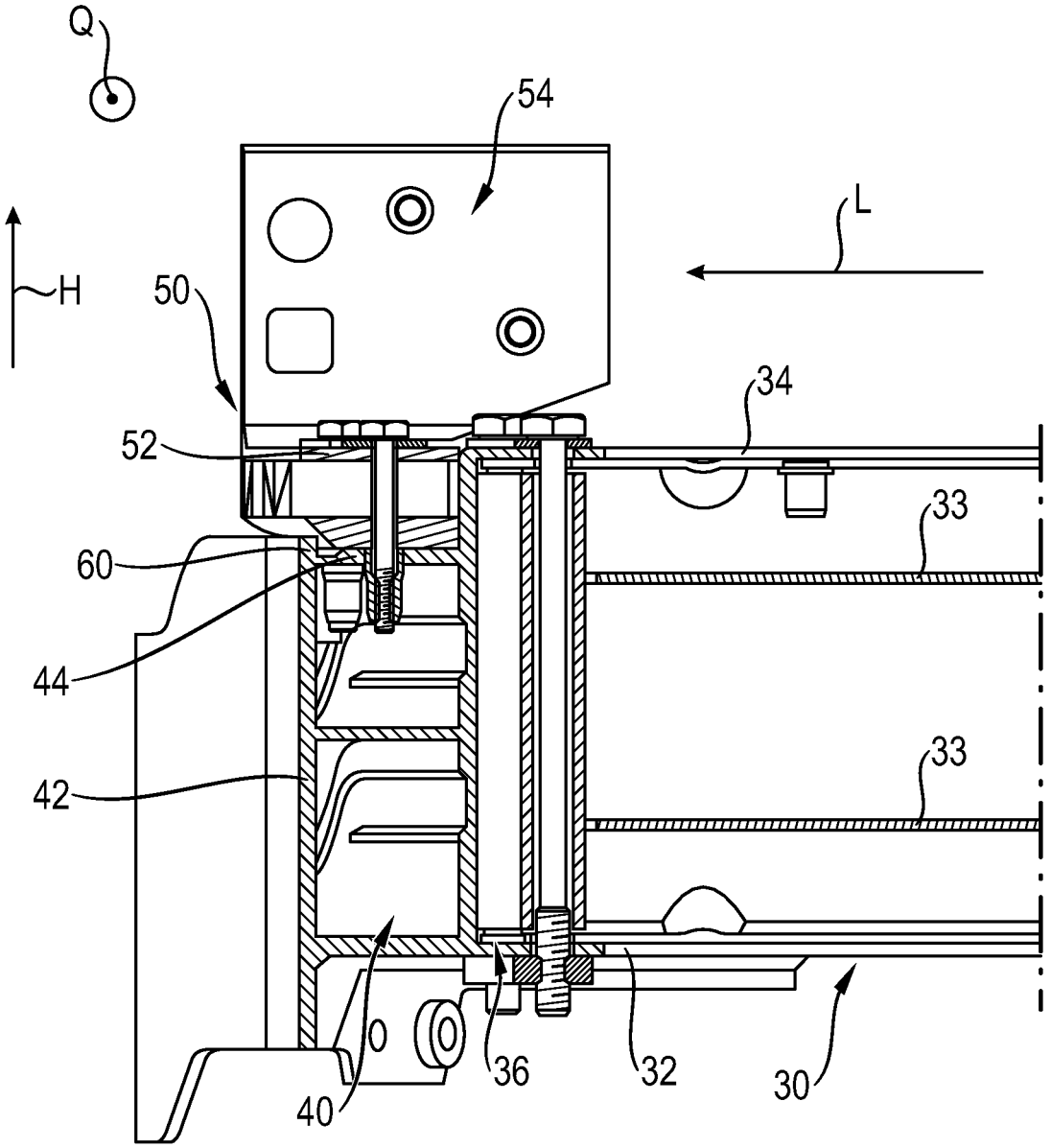
FIG. 1 is a sectional view of a beam structure according to a first exemplary embodiment of the invention.

The disclosure concerns a beam structure 20 for a body of a motor vehicle, and a motor vehicle with a body comprising such a beam structure 20.

The beam structure 20 comprises at least two shock-absorbing beam elements 30 which extend substantially in a longitudinal direction L and each have a first outer wall 32, a second outer wall 34 running substantially parallel to the first outer wall 32, and an inner wall 33 running substantially parallel to the first outer wall 32 and to the second outer wall 34; at least one crossmember 40 which extends substantially in a transverse direction Q running perpendicularly to the longitudinal direction L and is arranged at a first end 36 of the shock-absorbing beam element 30 and is connected both to the first outer wall 32 and to the second outer wall 34 and/or the inner wall 33; and at least two structural elements 50 which are each arranged at the first end 36 of one of the shock-absorbing beam elements 30 and are connected to the second outer wall 34 and/or the inner wall 33 of the respective shock-absorbing beam element 30 and/or to the crossmember 40.

Such a beam structure 20 is usually provided for installation in a front part, in particular in an engine bay, of the motor vehicle.

The shock-absorbing beam elements 30 may also be described as crash boxes and form a load path of a front impact-absorbing system.

In the correct installation position of the beam structure 20, the longitudinal direction L corresponds substantially to the direction of travel of the motor vehicle (X direction), and the transverse direction Q is a horizontal direction running transversely to the direction of travel of the vehicle (Y direction). A height direction H running transversely to the transverse direction Q and to the longitudinal direction L, in the correct installation position of the beam structure 20, corresponds to a vertical direction (Z direction).

The crossmember 40 may be arranged eccentrically in the height direction H on the shock-absorbing beam element 30. The crossmember 40 may also have a smaller installation height than the remaining beam structure 20 in the height direction H.

The shock-absorbing beam element 30 may comprise multiple, preferably two inner walls 33. The inner wall or walls 33 may be arranged between the first outer wall 32 and the second outer wall 34.

The structural element 50, as shown in FIG. 1, may be bolted to the crossmember 40. The structural element 50 may be bolted to the crossmember 40 with the same bolt which connects the crossmember 40 to the shock-absorbing beam element 30.

Figure 4A:
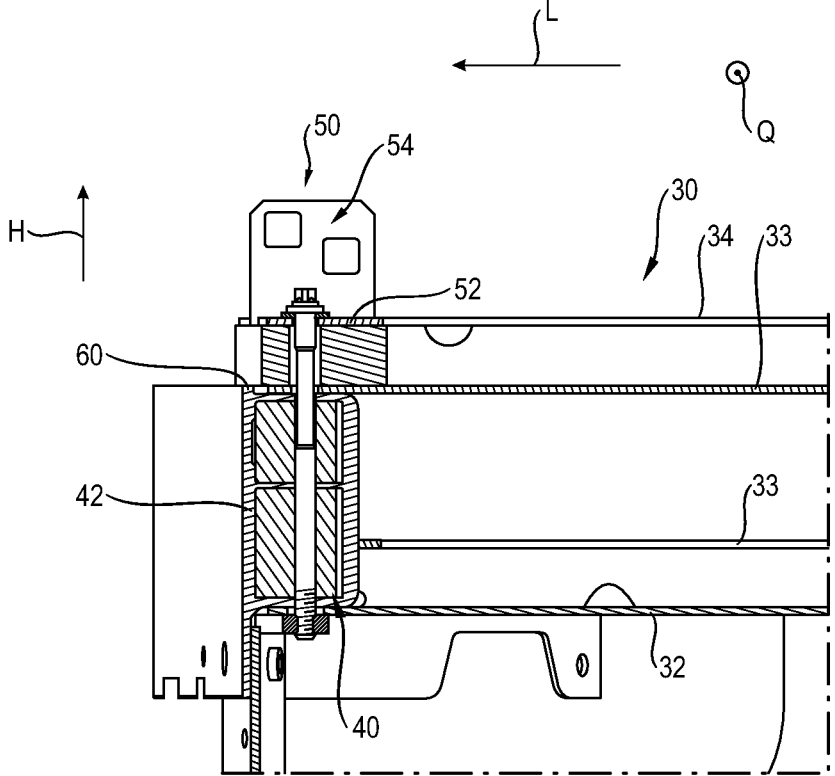
FIG. 4a is a sectional view of a beam structure according to a second exemplary embodiment of the invention.
Figure 4B:
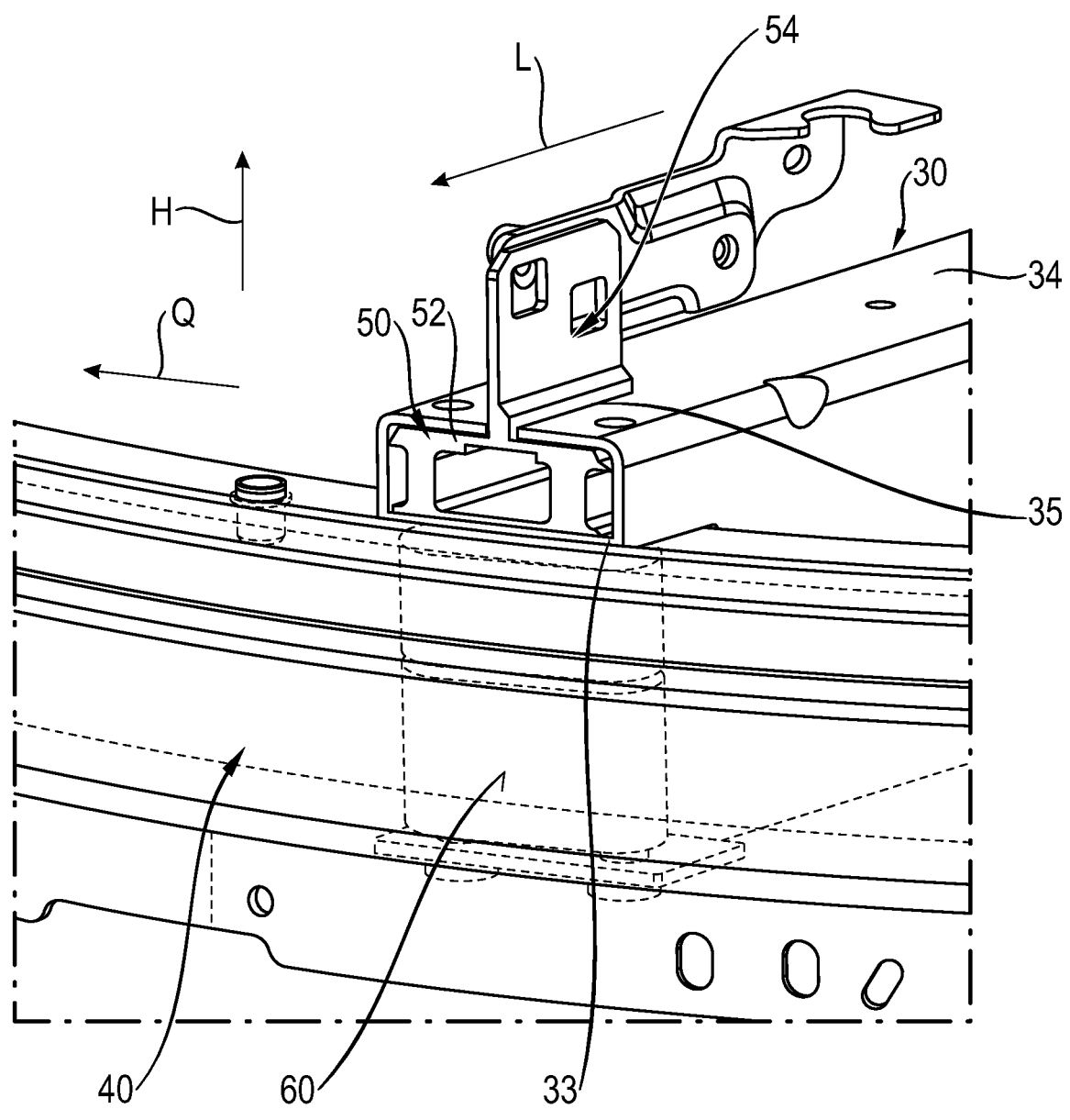
FIG. 4b is a perspective view of the beam structure according to the second exemplary embodiment of the invention.
Figure 5:
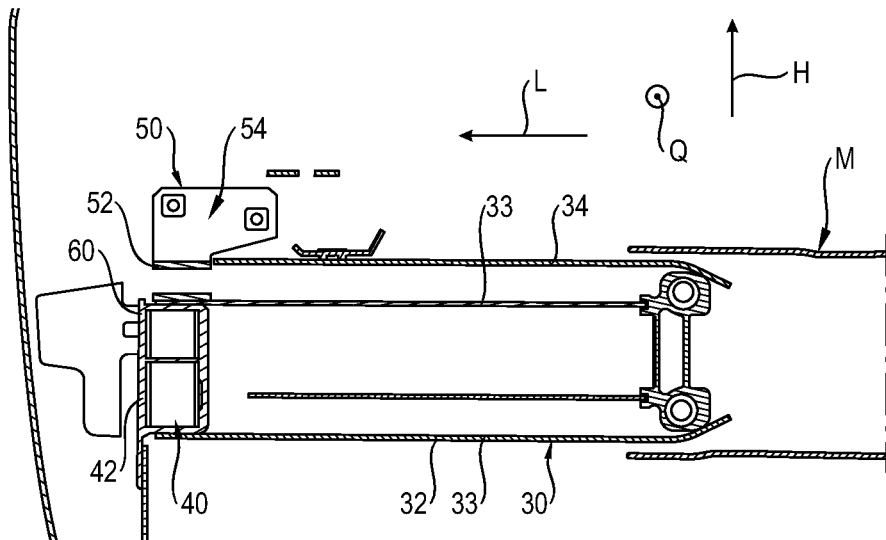
FIG. 5 is a sectional view of a beam structure according to a third exemplary embodiment of the invention.

Alternatively or additionally, as shown in FIG. 4, the structural element 50 may be bolted to the respective shock-absorbing beam element 30.

The structural elements 50 may, depending on attachment system, be embedded in the shock-absorbing beam element 30 and/or the crossmember 40, or placed on the shock-absorbing beam element 30 and/or the crossmember 40. Thus, for example, the structural element 50 of the beam structure 20 may be placed on the crossmember 40 according to the first exemplary embodiment and third exemplary embodiment, and the structural element 50 of the beam structure 20 may be embedded in the shock-absorbing beam element 30 according to the second exemplary embodiment.

Figure 2:
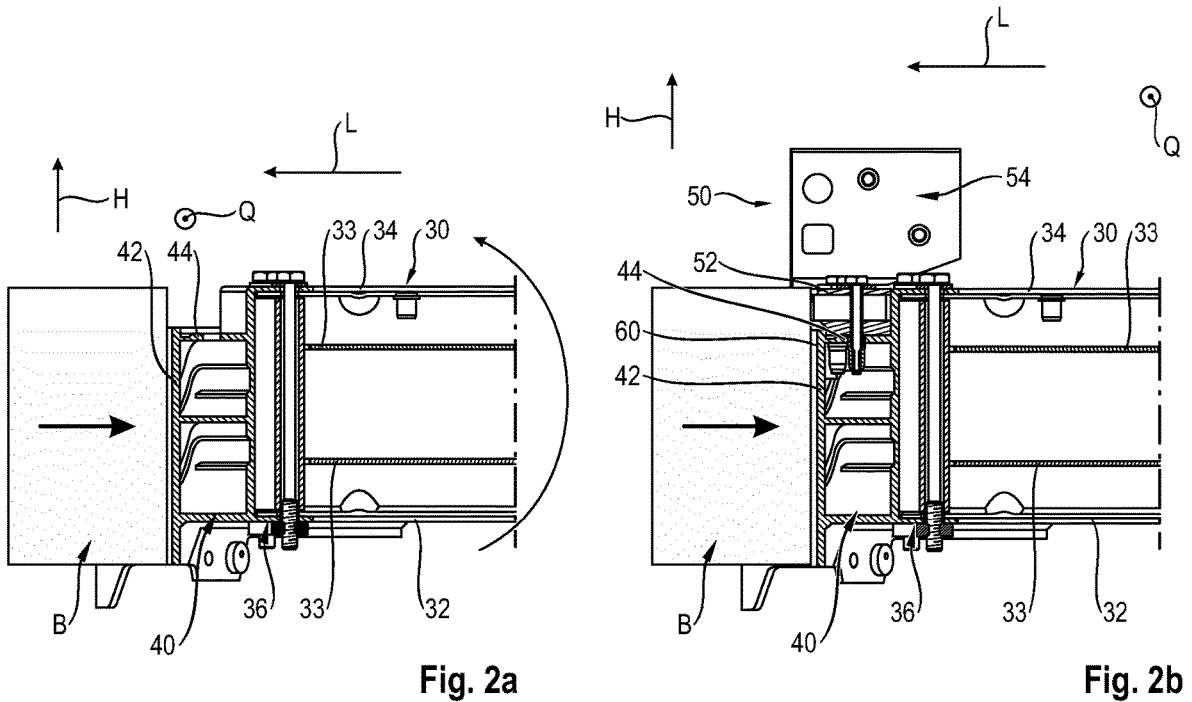
FIG. 2a is a further sectional view of a beam structure according to the first exemplary embodiment, which illustrates the beam structure without a structural element.
FIG. 2b is a further sectional view of a beam structure according to the first exemplary embodiment.

In the first exemplary embodiment and third exemplary embodiment, the structural element 50 is placed on the crossmember 40. Preferably, the structural element 50 may be bolted to an outer face 44 of the crossmember 40 which is accessible from the outside, as shown in particular in FIG. 2b.

According to the first exemplary embodiment, the crossmember 40 may bear on the outside of the shock-absorbing beam element 30, in particular on the outside of the first outer wall 32 and/or the second outer wall 34, and preferably be bolted to the first outer wall 32 and/or the second outer wall 34.

According to the second and third exemplary embodiments, the crossmember 40 may bear on the inside of the shock-absorbing beam element 30, in particular on the inside of the first outer wall 32 and/or the second outer wall 34, and/or bear on the inner wall 33 and preferably be bolted to the first outer wall 32 and/or the second outer wall 34 and/or the inner wall 33.

The structural element 50 may therefore bear on the outside of the crossmember 40 as shown in FIGS. 1 to 2b and 5.

Alternatively, as shown in FIG. 4, the structural element 50 may be embedded in the shock-absorbing beam element 30, i.e. bear on the inside of the shock-absorbing beam element 30.

FIGS. 2a and 2b illustrate the load input into the beam structure 20 on an impact of the motor vehicle, for example in a traffic accident or crash test. In such a traffic accident or crash test, a component B of the motor vehicle, or a part penetrating into the motor vehicle from the outside, may be pressed onto the beam structure 20. As illustrated in FIG. 2a, if the structural element 50 were omitted, a torque would be introduced into the beam structure 20. The force input would be asymmetrical. In contrast, as shown in FIG. 2b, the structural element 50 helps reduce the torque.

The crossmember 40 and the structural element 50 may together, in a height direction H, have an installation height which corresponds approximately to an installation height of the shock-absorbing beam element 30 in the height direction H, and/or is greater than the installation height of the shock-absorbing beam element 30 in the height direction H.

The crossmember 40 may comprise a contact face 42 protruding in the longitudinal direction L which, in a height direction H, has an installation height which is smaller than an installation height of the shock-absorbing beam element 30 in the height direction H.

The at least two structural elements 50 may each be connected to the crossmember 40 by means of a screw connection. The crossmember 40 may be connected to the shock-absorbing beam element 30 by means of a screw connection. Furthermore, the shock-absorbing beam elements 30 may each be connected to the engine longitudinal member of the motor vehicle by means of a screw connection.

The at least two structural elements 50 may each comprise a third outer wall 52 which runs substantially coplanar with the second outer wall 34 of the respective shock-absorbing beam element 30. This embodiment is shown in particular in FIGS. 1, 2b and 5. Alternatively, if the structural elements 50 are embedded in the shock-absorbing beam element 30, the structural element may comprise a third outer wall 52 which bears superficially on the second outer wall 34 of the respective shock-absorbing beam element 30. This design is shown in particular in FIG. 4a.

In the second exemplary embodiment, the structural element 50 is embedded in the shock-absorbing beam element 30. The structural element 50 may here be received in the shock-absorbing beam element 30, at least partially by form fit, between the second outer wall 34 and the inner wall 33. The third outer wall 52 may preferably bear on the inside of the second outer wall 34, and a portion of the structural element 50 arranged opposite the third outer wall 52 may be supported on the inner wall 33.

The crossmember 40, in particular the contact face 42 of the crossmember 40, together with the structural element 50, may form a force input surface 60 which extends substantially orthogonally to the longitudinal direction L and/or to the first outer wall 32 and/or to the second outer wall 34 and/or to the third outer wall 52. Preferably, a dimension of the force input surface 60 in the height direction H is greater than or equal to an installation height of the shock-absorbing beam element 30 in the height direction H.

Figure 3:
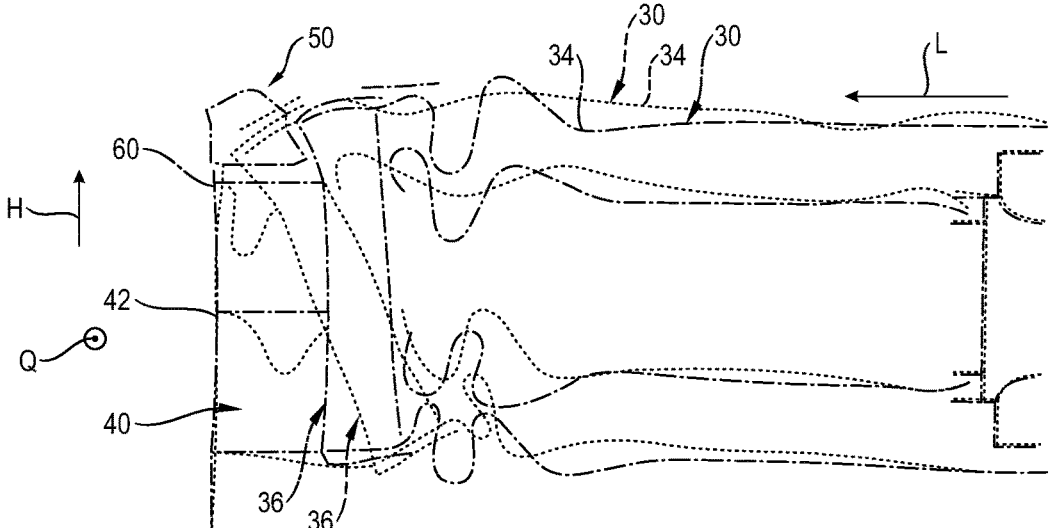
FIG. 3 is a schematic sectional view, illustrating firstly a deformation of the beam structure without structural element and secondly a deformation of the beam structure with structural element in the case of a crash.

FIG. 3 illustrates various deformations of a beam structure 20 in the case of an impact of the motor vehicle. The deformation illustrated in dash-dotted lines corresponds to the deformation of a beam structure 20 which has the described structural elements 50, whereas the deformation shown in dotted lines corresponds to a deformation of a beam structure which has no structural elements 50. If the beam structure 20 has no structural elements 50 a tilting of the crossmember 40 occurs at the front edge of the beam structure 20. Such a tilting is reduced with the beam structure 20 which has the structural elements 50.

The structural element 50 may comprise at least one fixing portion 54 for fixing additional components, which preferably extends substantially in a plane orthogonal to the transverse direction Q. The shock-absorbing beam element 30 may furthermore comprise a cutout 35 formed in the second outer wall 34, through which the fixing portion 54 extends. This design is shown in particular in FIG. 4*b*.

The beam structure 20 according to the disclosure allows a straight crumple behavior of the shock-absorbing beam elements 30 (crash boxes), in particular for beam structures 20 with crossmember 40 which is arranged eccentrically in the height direction H and has a smaller installation height than the remaining beam structure 20 in the height direction H. This leads to a desired overall vehicle crash kinematic.

The invention claimed is:

1. A beam structure for a body of a motor vehicle, comprising:
    at least two shock-absorbing beam elements extending substantially in a longitudinal direction, each having a first outer wall, a second outer wall running substantially parallel to the first outer wall, and an inner wall running substantially parallel to, and coextensive with, the first outer wall and the second outer wall in the longitudinal direction;
    at least one crossmember extending substantially in a transverse direction perpendicularly to the longitudinal direction, the crossmember being arranged at a first end of the at least two shock-absorbing beam elements and being connected both to the first outer wall and to the second outer wall and/or the inner wall; and
    at least two structural elements, each being arranged at the first end of a respective one of the two shock-absorbing beam elements and being connected to the second outer wall and/or the inner wall of the respective shock-absorbing beam element and/or to the crossmember,
    wherein the crossmember is arranged eccentrically on the at least two shock-absorbing beam elements in a height direction running transversely to the longitudinal direction and transversely to the transverse direction, and wherein each structural element is arranged at least partially above the cross member in the height direction.

2. The beam structure according to claim 1, wherein the crossmember and the structural element together, in the height direction running transversely to the longitudinal direction and transversely to the transverse direction, have an installation height corresponding approximately to an installation height of the shock-absorbing beam element in the height direction, and/or is greater than the installation height of the shock-absorbing beam element in the height direction.

3. The beam structure according to claim 1, wherein the crossmember comprises a contact face protruding in the longitudinal direction which, in the height direction running transversely to the longitudinal direction and transversely to the transverse direction, has an installation height which is less than an installation height of the shock-absorbing beam element in the height direction.

4. The beam structure according to claim 1, wherein the at least two structural elements are each connected via a screw connection to the crossmember and/or to the respective shock-absorbing beam element.

5. A beam structure for a body of a motor vehicle, comprising:
    at least two shock-absorbing beam elements extending substantially in a longitudinal direction, each having a first outer wall, a second outer wall running substantially parallel to the first outer wall, and an inner wall running substantially parallel to the first outer wall and to the second outer wall;
    at least one crossmember extending substantially in a transverse direction perpendicularly to the longitudinal direction, the crossmember being arranged at a first end of the at least two shock-absorbing beam elements and being connected both to the first outer wall and to the second outer wall and/or the inner wall; and
    at least two structural elements, each being arranged at the first end of a respective one of the two shock-absorbing beam elements and being connected to the second outer wall and/or the inner wall of the respective shock-absorbing beam element and/or to the crossmember, wherein
    the at least two structural elements each comprise a third outer wall which runs substantially coplanar with the second outer wall of the respective shock-absorbing beam element and/or bears on the second outer wall of the respective shock-absorbing beam element.

6. The beam structure according to claim 3, wherein the contact face of the crossmember, together with the structural element, forms a force input surface which extends substantially orthogonally to the longitudinal direction and/or to the first outer wall.

7. The beam structure according to claim 1, wherein the structural element comprises at least one fixing portion for fixing of additional components, which extends preferably substantially in a plane running orthogonally to the transverse direction.

8. The beam structure according to claim 7, wherein the shock-absorbing beam element further comprises a cutout formed in the second outer wall, through which the fixing portion extends.

9. The beam structure according to claim 1, wherein the structural element is embedded in the shock-absorbing beam element and bears on an inner side of the shock-absorbing beam element.

7

8

10. A motor vehicle, comprising:

a body, wherein the body comprises at least two shock-absorbing beam elements extending substantially in a longitudinal direction, each having a first outer wall, a second outer wall running substantially parallel to the first outer wall, and an inner wall running substantially parallel to, and coextensive with, the first outer wall and the second outer wall in the longitudinal direction;

at least one crossmember extending substantially in a transverse direction perpendicularly to the longitudinal direction, the crossmember being arranged at a first end of the at least two shock-absorbing beam elements and being connected both to the first outer wall and to the second outer wall and/or the inner wall; and at least two structural elements, each being arranged at the first end of a respective one of the two shock-absorbing beam elements and being connected to the second outer wall and/or the inner wall of the respective shock-absorbing beam element and/or to the crossmember, wherein the crossmember is arranged eccentrically on the at least two shock-absorbing beam elements in a height direction running transversely to the longitudinal direction and transversely to the transverse direction, and wherein each structural element is arranged at least partially above the cross member in the height direction.

* * * * *